(12) United States Patent
Ahuja et al.

(10) Patent No.: US 10,158,979 B2
(45) Date of Patent: Dec. 18, 2018

(54) METHOD AND SYSTEM FOR WIRELESS LOCATION AND MOVEMENT MAPPING, TRACKING AND ANALYTICS

(71) Applicant: ELENYTICS GROUP, LTD., Edinburgh, Scotland (GB)

(72) Inventors: Rohan Ahuja, Singapore (SG); Sergi Bernal Sague, Roses (ES); Sayan Ghosh, Fremont, CA (US); Tomas Choi, Fremont, CA (US); Jeffrey Ni, Fremont, CA (US)

(73) Assignee: ELENYTICS GROUP, LTD., Edinburgh (GB)

( * ) Notice: Subject to any disclaimer, the term of this patent is extended or adjusted under 35 U.S.C. 154(b) by 0 days.

(21) Appl. No.: 15/678,585

(22) Filed: Aug. 16, 2017

(65) Prior Publication Data
US 2018/0054712 A1 Feb. 22, 2018

Related U.S. Application Data

(60) Provisional application No. 62/375,664, filed on Aug. 16, 2016.

(51) Int. Cl.
| | |
|---|---|
| *H04W 4/33* | (2018.01) |
| *H04W 4/02* | (2018.01) |
| *H04W 84/12* | (2009.01) |
| *H04W 4/04* | (2009.01) |

(52) U.S. Cl.
CPC ............. *H04W 4/04* (2013.01); *H04W 4/023* (2013.01); *H04W 4/33* (2018.02); *H04W 84/12* (2013.01)

(58) Field of Classification Search
CPC ................................ H04W 4/04; H04W 84/12
See application file for complete search history.

(56) References Cited

U.S. PATENT DOCUMENTS

| | | | | |
|---|---|---|---|---|
| 8,989,775 | B2 * | 3/2015 | Shaw | H04W 24/00 455/414.2 |
| 9,832,615 | B2 * | 11/2017 | Palanki | H04W 4/04 |
| 9,888,081 | B1 * | 2/2018 | Farinelli, Jr. | H04W 40/20 |
| 2006/0240840 | A1 * | 10/2006 | Morgan | G01S 5/02 455/456.1 |
| 2011/0235623 | A1 * | 9/2011 | Alizadeh-Shabdiz | G01S 5/0278 370/338 |
| 2012/0249798 | A1 * | 10/2012 | Kim | G01S 19/48 348/159 |
| 2014/0018096 | A1 * | 1/2014 | Jagannath | H04W 4/021 455/456.1 |

(Continued)

*Primary Examiner* — Ajit Patel
(74) *Attorney, Agent, or Firm* — Benesch, Friedlander, Coplan & Aronoff LLP

(57) ABSTRACT

The present invention is a location based data analytics system and method that functions to track individuals and/or equipment within a bounded location that may be an indoor or outdoor location, or a combination of indoor and outdoor locations, within a geographic site that is a bounded location. The system captures the real-time movements of the individuals/equipment and generates location and time statistics based upon real-time movements. The system is also operable to generate analytics based upon the information collected relating to the movements of the individuals/equipment as well as insights. The location and movement information can be mapped in real-time or over time.

15 Claims, 8 Drawing Sheets

(56) References Cited

U.S. PATENT DOCUMENTS

2016/0102995 A1* 4/2016 Gum .................... H04W 4/043
                                                 702/98
2017/0127241 A1* 5/2017 Sjolund .................. H04W 4/04
2017/0127376 A1* 5/2017 Jones .................. H04W 64/003
2017/0142597 A1* 5/2017 MacDonald .......... H04W 16/18

* cited by examiner

METHOD AND SYSTEM FOR WIRELESS LOCATION AND MOVEMENT MAPPING, TRACKING AND ANALYTICS

RELATED APPLICATIONS DATA

This application claims priority to U.S. Provisional Application No. 62/375,664 filed Aug. 16, 2016.

FIELD OF INVENTION

This invention relates in general to the field of wireless location and movement tracking and more particularly to relating location and movement tracking to a location map and analysis of such information.

BACKGROUND OF THE INVENTION

Wireless connectivity technologies have led to applications in tracking the location and movement of people and wireless devices in relation to geographic areas. There has been a progression of such technologies over many years. Several patent documents reference such technologies, including the following.

U.S. Patent Application Publication No. 2014/0018096 filed on Jul. 16, 2013 and owned by Aisle411, Inc., discloses a system for indoor mapping. Wireless signals from wireless devices within an indoor area are received and utilized to create a wireless signal fingerprint that identifies each signal and the strength of the signal. The location that the wireless signal fingerprint was taken can be geo-referenced on a map. The wireless signal fingerprints for an area can be mapped, and a user may determine a location by comparing a wireless signal fingerprint generated by the user to wireless signal fingerprints previously taken within the indoor area.

U.S. Pat. No. 8,989,775 issued on Mar. 24, 2015 to RetailNext, Inc., discloses techniques for tracking the location of a device that transmits a wireless signal. The wireless signal is received at a set of receivers. Distances to the device are determined based on the signal strength. Boundaries encompassing possible locations of the device are defined based upon the distances, and boundary intersections are analyzed in order to determine the location of the device. A set of video cameras can be utilized to track subjects, and tracks from the cameras can be projected onto a floor plan map of an indoor location, such as a store.

U.S. Pat. No. 8,989,880 issued on Mar. 24, 2015 to ZIH Corp., discloses a system for providing performance analytics using dynamics/kinetics models, based on role data or weather data and real time data relating to the movement and proximity of tagged objects. Each participant to be tracked has a tag correlated thereto, and tag locations are determined based upon blink data. Tag location data may also be compared to participant dynamics/kinetics models based at least in part on the participant role data.

U.S. Pat. No. 9,046,373 issued on Jun. 2, 2015 to TRX Systems, Inc., discloses a system for locating, tracking, and/or monitoring the status of personnel and/or assets indoors and outdoors. Tracking data is obtained from a source and provided as input to a mapping application. The mapping application generates position estimates for trackees and utilizes information from building data to enhance position estimates when available. For indoor tracking, sensor fusion methods and map matching may be utilized to compute a more accurate tracking estimate for trackees. For outdoor tracking, combining tracking estimates such as inertial tracks with magnetic and/or compass data with GPS if available may be utilized to enhance outdoor tracking data.

U.S. Patent Application Publication No. 2015/0235161 filed on Feb. 14, 2014 and owned by BBY Solutions, Inc., discloses a system for tracking customers and employees in a commercial environment, such as a retail store. The invention requires that devices be operated by the customers and employees within the store. The system tracks the devices that are associated with either a customer or an employee.

U.S. Pat. No. 8,983,493 issued on Mar. 17, 2015 to Skyhook Wireless, Inc., discloses a method of providing a relevant subset of information to a client device based on scanning for Wi-Fi access points within range of the client device within a target region. A Wi-Fi database that covers the target region may be utilized to retrieve information about the access points and to estimate the position of the mobile client device as an estimated location. A limited region in the vicinity of the estimated location of the client device may be selected and information about Wi-Fi access points within the limited region may be provided to client.

What is needed is a system and method: for use indoors, outdoors and in an indoor/outdoor combination within a bounded location that is operable to track people and/or equipment within the bounded location; that employs a calibration process to measure wireless signals at calibration points identified within the bounded region; that post-calibration is operable to track a person or equipment moving within the bounded location through use of a device that is related to the person or equipment to take readings of Wi-Fi signal strengths from the calibration points at intervals in time and to determine the nearest calibration point to the device; that generates location information relating to the person or equipment and may render such information on a map, such as a map of the bounded location. What is further needed is a system operable to analyze the location information in order to determine effective use of one or more areas, or the facilities relating to one or more areas, within the bounded space at points in time.

SUMMARY OF THE INVENTION

In one aspect, the present disclosure relates to a location based data analytics method that comprises the steps of: identifying one or more calibration points within a bounded location; performing a calibration process whereby the Wi-Fi signal strength of each of the one or more calibration points is measured; a device corresponding to an individual receiving Wi-Fi signals from one or more calibration points within the bounded location that are in the vicinity of the device to track the individual in the bounded location; performing processing and analysis of tracking of the individual; and generating tracking results, mapping and insights for a user.

In another aspect, the present disclosure relates to such a location based data analysis method, further incorporating the step of tracking the individual within the bounded location that is any of the following: an indoor location, an outdoor location, or a combination of indoor and outdoor locations.

In yet another aspect, the present disclosure relates to such a location based data analysis method, further incorporating the step of tracking the individual in real-time.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The invention will be better understood and objects of the invention will become apparent when consideration is given to the following detailed description thereof. Such description makes reference to the annexed drawings wherein.

Figure 1:
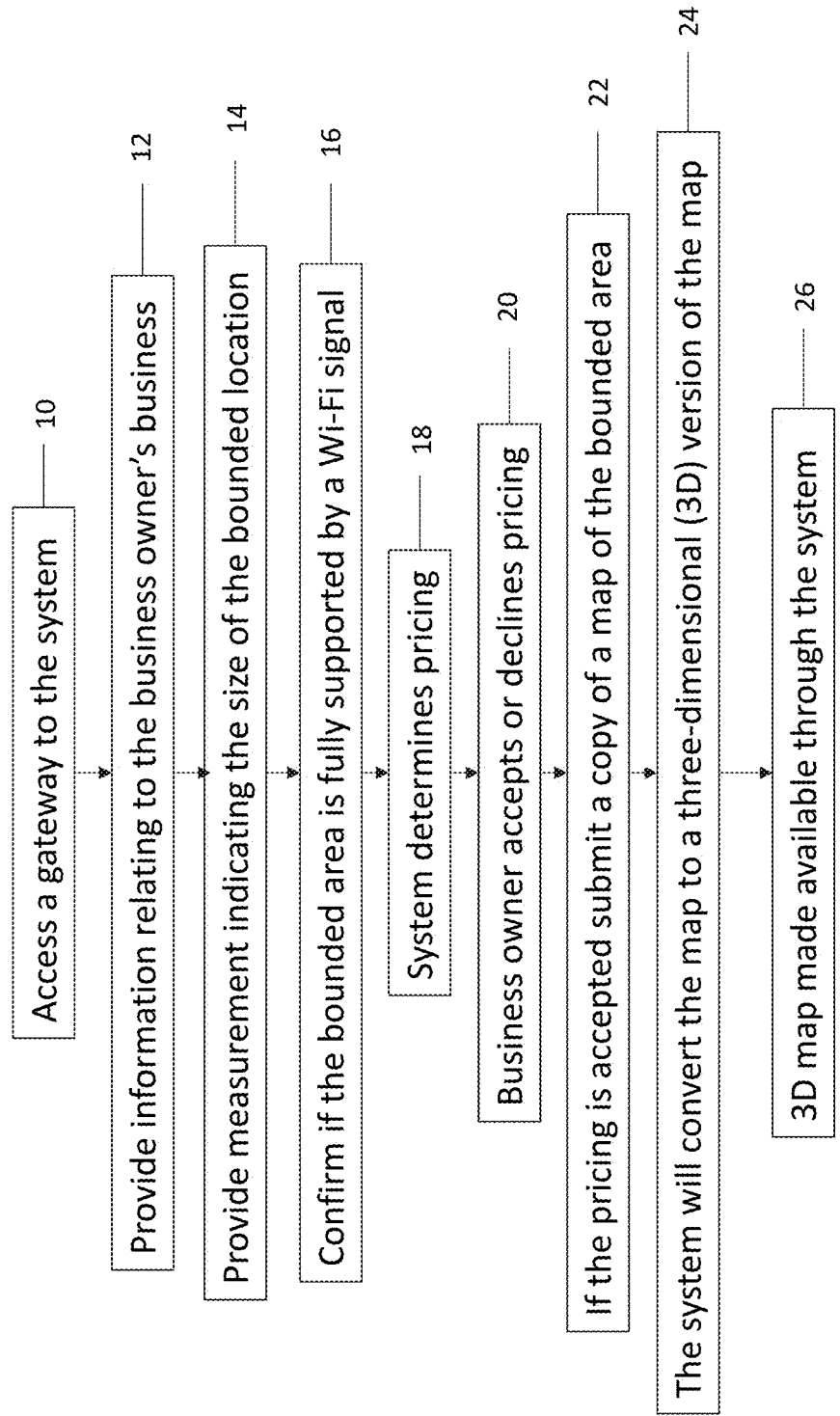
FIG. 1 is a flow chart of the steps of a business owner sign-in process, in accordance with an embodiment of the present invention.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

The present invention is a location based data analytics system and method that functions to track individuals and/or equipment within a bounded location that may be an indoor or outdoor location, or a combination of indoor and outdoor locations, within a geographic site that is a bounded location. The system captures the real-time movements of the individuals/equipment and generates location and time statistics based upon real-time movements. The system is also operable to generate analytics based upon the information collected relating to the movements of the individuals/equipment as well as insights. The location and movement information can be mapped in real-time or over time.

The invention involves a calibration process wherein: within the bounded location (indoor, outdoor, or combination thereof) measurements of wireless signal strengths are taken from a set of predetermined calibration points; and processing, such as by a classifier algorithm or other processing application, is applied to the results. Post-calibration, while a user is moving about the bounded location, a user's device will take readings of Wi-Fi signal strengths from the same points as the calibration points, at points in time. For example, such as at regular points in time, or at random points in time. As one example, an embodiment of the present invention may take such readings every five seconds. Such Wi-Fi signal strength information is processed, such as by a classifier algorithm or other processing application, and the output generated indicates the nearest calibration point. Embodiments of the present invention can be run based upon Wi-Fi, Bluetooth™ technology, or other communication technologies, or any combination of communication technologies may be integrated into the system.

Therefore, once the system is calibrated, as a user or equipment moves within the bounded area the user's device (or the equipment's device) will take readings of Wi-Fi signal strengths from the same points as the calibration points. Such Wi-Fi signal strength information is provided to the system and processed to produce output that indicates the nearest calibration point to the user's device (or to the equipment's device).

Location information is generated by the system and is stored by the system. The most recent location information can be rendered on a map either in real-time or not in real-time. Movements of a person or equipment may also be rendered on a map in either real-time or over time. A skilled reader will recognize that a variety of other reports can also be generated by the system.

One example of an applications of the system is for: tracking the movement of students within a university campus to determine the density and paths of the students. Such an embodiment of the system may perform multiple types of analysis, including analysis relating to the location and movement of the students, as well as analysis relating to resources utilized in areas within the campus. For example, the analytics of the system may identify areas on the campus that are not populated by students during certain periods of time, and indicates that heating or other utilities utilized by such an area can be adjusted in that area during the times when it is empty to lower utility consumption and costs (such as indication may be presented to a user as an insight).

As another example, an embodiment of the present invention may track the location and movement of shopping carts and shopping baskets, as well as of employees within a store. For example, in such an embodiment the analytics of the system may identify key product placement locations, employee locations within the store at particular points in time, and the most common paths of the customers through the store at various points in time.

The information generated by the system and method may be provided to a user in a variety of outputs. For example, a web-based dashboard display may be generated to provide statistics, information analysis results (such as insights regarding or otherwise relating to uses of one or more areas within the bounded location, or other insights based upon the analysis), thermal maps, real-time location data, mapped movement over time, etc. Such a dashboard may be accessed through a website, or otherwise via the Internet (e.g., through a mobile device via an application downloaded to the mobile device, or through a server connection via the Internet).

The information provided to various users may differ depending on the status of the user (e.g., an operator, a signed-in user, a user without any sign-in, etc.), the type of user (e.g., administrator, general user, manager of the bounded location or any area therein, etc.), or the bounded location or areas therein of the system. For example, if the bounded location is a store, then customers to the store may be able to access an indoor map of the store and their own location within the store. The system may also provide to a user other information, such as offers, promotions or alerts relating to the store, or the general information relating to the business of the store.

Embodiments of the present invention can incorporate a variety of elements that can different steps, including elements discussed herein as well as one or more of the following:

- software installed on mobile devices operable to provide information relating to the position of mobile devices within a bounded location, or mapping of the position of mobile devices within a bounded location;
- software and processors operable to provide position-related information about people and their movement within a bounded location;
- software and processors operable to analyze information relating to the presence and movement of visitors to a bounded location that is a physical site. The software is operable to capture the movement and flow of the visitors throughout the bounded location. This capture may be of movement and flow in real time, or over time. The software may be further operable to perform processing to determine wait times, queue times, and dwell times experienced by the visitor or one or more other visitors, and popular paths of the visitor, as well as to assess the presence of new and repeat visitors within the bounded location, based on the captured movement and flow throughout the site. Such software and processors may be identified as a site visitor analysis system;
- software and processors operable to receive information relating to the position of persons, who may be personnel, based upon information transmitted from wearable position monitoring devices worn by the persons. The present invention may further process such information to determine the movement of the personnel;
- software installed on mobile devices operable to obtain information relating to the position of the mobile devices within the bounded location and to generate and display on the mobile device route guidance and navigation options to a destination within the bounded location;
- software and processors operable to detect the presence of a mobile device near a point of interest within a bounded location, and to automatically trigger an action when such presence of a mobile device near the point of interest is detected. As an example, the action that is triggered may be sending of an alert or a notification to the mobile device;
- software and processors operable to locate and monitor active Wi-Fi devices and to analyze information obtained relating to such located and monitored Wi-Fi devices;
- a personnel management system that operates such that wearable position monitoring devices are utilized to determine the position of personnel wearing the wearables through a combination of the Wi-Fi signals from calibration points measured by the wearables, and the position of one or more cameras in the bounded location. The system further is operable to process and store information relating to the movement of the personnel;
- systems and processors operable to locate and monitor active Wi-Fi devices and to perform analysis of information relating to the located and monitored Wi-Fi devices;
- a centrally hosted computer application software and application programming interface (API) for mobile devices, namely, geographic information system software operable to perform indoor mapping, positioning, and analysis of collected data;
- downloadable geographic information system software and processors operable to perform indoor mapping, positioning, and analysis of derived or collected information that is location information of the present system;
- software, such as downloadable software, and processors operable for users of wireless devices to map wireless access points and cellular communications towers in a bounded location, and to utilize the map to ascertain the users' positions within the bounded location;
- software, such as downloadable software, and processors operable for users of wireless devices to map wireless access points and cellular communications towers within a bounded location, communicate with a central server which receives maps of wireless access points and cellular communications towers from users and distributes maps of wireless access points and cellular communications towers received from users, and to ascertain a user's position within a bounded location using the distributed maps;
- software and processors operable to manage one or more databases of geographical information, that may include positions of stores and other places of interest, and one or more databases of maps that incorporate commentary about mapped places in association with the places therein, the system generate a single map that may merge, combine, or otherwise incorporate the position information and the commentary;
- a telecommunication network of users of wireless devices, and software and processors operable to manage the network of users of wireless devices; and
- generating, updating and modifying a web site that is operable to provide position information for wireless devices, including providing such position information upon the request of a user. The website may collect position information about users of wireless devices and distribute the collected position information.

In some embodiments of the present invention, some or all users will be required to sign-in to the system prior to use thereof.

In some embodiments of the present invention a chip may be utilized in place of a mobile device. The chip may be a particle chip, or another type of chip. In such embodiments the chip may be integrated into a housing, such as a plastic holder, a mobile device, or any other housing. Examples of the housing may include wristbands, cards, tags or other housings that are portable or wearable by a user. The chip may function to receive and transmit signals to and from the system, and the movement of a user may be tracked through communications between the system and chip in a similar manner as described herein for a communications to and from a mobile device to the system.

A variety of chips may be used for this purpose, including proprietary chips with circuitry designed to create a chip with the least possible mass and/or bulk (e.g., a thinner configured chip), and/or chips with efficiencies for charging (i.e., operable to charge quickly), and/or chips with other efficiencies, such as long-range communication operability, durability, etc. In some embodiments of the present invention data can be stored upon such chips and downloaded to the system through a wired or wireless connection with the system. In some embodiments of the present invention a case may be designed whereby multiple chips can be charged and information can be downloaded therefrom simultaneously.

In some embodiments the chip may incorporate multiple sensors. For example, a magnetic sensor may be incorporated in the chip for the purpose of identifying the direction that a chip is pointing. Other sensors may also be integrated into the chips. The sensors may provide information that can be utilized in the analysis of the system, and possibly in the mapping feature of the system that identifies the paths and real-time locations of users within the space where the system is functioning.

In some embodiments of the present invention fixed access points may be identified and chips may be constantly connected to such fixed and known locations. The fixed access points will allow for analysis of the variations of the communication signals (Wi-Fi signals or other communication signals). Causes of variations in the signal may include movement or change in location of people or objects within a room, or any other factors that modify the signal fingerprint from that which is initially identified for the signal (e.g., the signal fingerprint identified during the calibration process).

The identified variations can be transferred to the computing element of the system. The computing element can analyze the variations and produce results that can be used to adapt the system to function in light of the variations. This analysis will cause the system to function to recognize the variations and the modifications to the system operation necessary to identify the location of a user's mobile device or a chip carried by a user, to accurately track the path of the user within the space where the system is operated. The grid and function of the system may thereby be modified constantly and adapted to address the variations that occur and fluctuate as the system is utilized. The operation of the system will thereby account for the variations and adjust such that the variations will not create inaccurate tracking or analysis by the system.

The fixed access points will further operate as a Wi-Fi router that will improve the accuracy of the system. In some embodiments of the present invention, the fixed access points may be utilized to receive signals of the chips through Bluetooth technology and then send the signals to the server through a Wi-Fi communication technology. Such a system may increase the length of time that a battery can power a chip or mobile device during use in the system.

In some embodiments of the present invention when a chip or a mobile device takes a measurement multiple measurements will be taken immediately thereafter. A filter may be applied to diminish the noise inherent in each of the measurements. The result of the filtering will be an accurate, or virtually accurate approximation to the real signal that can be utilized by the system in its operation.

In some embodiments of the present invention, the system may detect the walls and other elements existing within a mapped area and may automatically assign calibration points based upon the analysis of the mapped area. Such embodiments will therefore identify calibration points in a quick and efficient manner, and may further identify optimum calibration points. The calibration points will be utilized as described herein.

In some embodiments of the present invention the system may incorporate a module or process operable to identify impossible paths within a space where the system will operate. For example, the system may identify walls, rivers, or other features that will make it impossible for a user to follow a particular path. Such identifications of impossible paths will cause the system to be able to better analyze and track the route that a user follows within a space where the system is operating. The system will know that a user cannot traverse certain routes because such routes are impossible paths for the user to follow. This will eliminate some possible paths that a user may have traversed from the system's analysis, and will cause the tracking of the user's route within a space where the system is functioning to be accurate or virtually accurate. The system may utilize features identified in a map of the space where the system will function to identify the impossible paths (e.g., a map that indicates walls or other causes for a path to be impossible for a user to traverse).

Benefits

The present invention offers several benefits over the prior art, including that the present invention may incorporate a bounded location that is an indoor location, an outdoor location, or a combination of both indoor and outdoor locations. The present invention further offers a benefit over the prior art in that it is operable to generate mapping of the whole of the bounded location, the location of one or more persons within such bounded location, and movement over-time of one or more persons within such bounded location.

Another benefit of the present invention over the prior art is that the present invention utilizes the nearest receiver or calibration point to identify the location of a person or equipment within the bounded location. This allows the present invention to produce accurate and specific location information relating to the location of the person or equipment. This is a benefit not only due to accuracy of the location information, but also due to the enhancement and improvement that utilizing such accurate location information in the invention offers. For example, improved and more accurate insights and processed information may be generated based upon the location information of the present invention over location information generated by the prior art.

Yet another benefit of the present invention over the prior art is that the present invention involves generating some mapping based upon location data. The prior art utilizes other information to generate mapping, not solely location data. The accuracy, the specific processing steps, and the speed of generating the mapping is improved and enhanced due to the present invention utilizing only location data to generate some mapping.

Still another benefit of the present invention over the prior art is that the present invention is operable to perform analysis to determine best uses of areas within the bounded location or of facilities relating thereto. The present invention utilizes the location data it receives and other data to produce insights for a user. These insights may relate to possible reductions of utility use (e.g., heat, air conditioning, etc.) within a particular area at specific times of the day when the area is not populated or has low population, based upon the location information generated by the present invention. Thus, the present invention is operable to provide insights that may lead to utility cost reduction, and reduced use of utilities, which can have environmentally advantageous outcomes.

The present invention may further be implemented and operated at a lower cost than prior art tracking systems, such as systems that incorporate RFID technologies.

Sign-In Process

As shown in FIG. 1, a user that is a business owner may be required to access a website, download or otherwise access an app on a mobile device, or access another gateway to the system, in accordance with step 10. The gateway to the system may be accessed through a computer, a mobile device, or some other device that has a screen connected thereto operable to display information, and an input device connected thereto, whereby information may be inputted into the gateway and thereby to the system.

Figure 8:
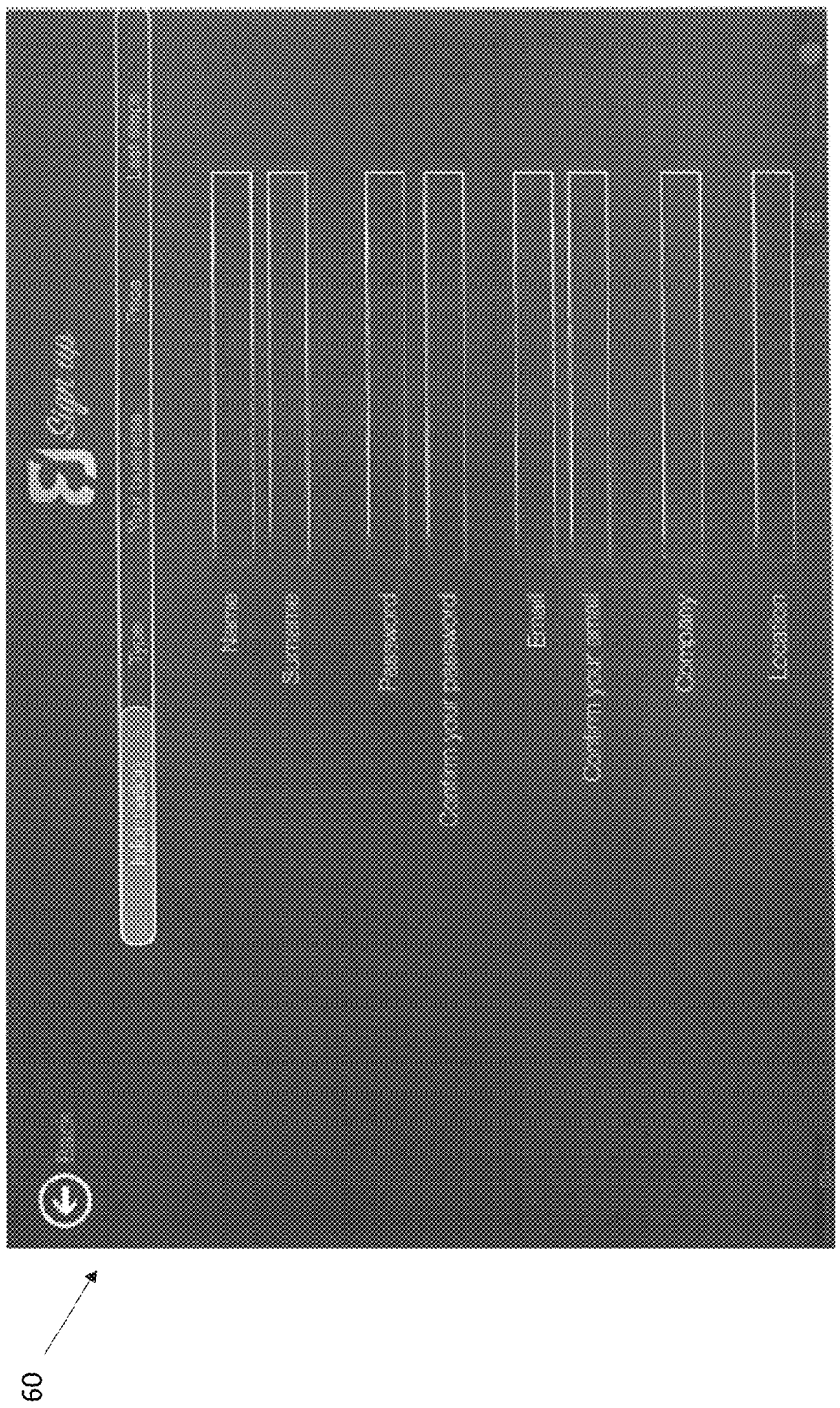
FIG. 8 shows a portion of a screen shot of a sign-in gateway page, in accordance with an embodiment of the present invention.

The business owner may be required to provide information to initiate and complete the sign-in process, such as the user's name, company information, location and email address. As shown in FIG. 8, the gateway may provide an information page 60 wherein information about the business owner and the business may be inputted by the business owner. For the purposes of this document, "business owner" may refer to the owner of the business, a manager of a business, an employee of the business, or any other party related to the business who is granted the authority to sign-in to the system for the purpose of setting-up use of the system within a bounded location that is related to a business. A business may indicate a store, an organization, such as a college, university, school, conservation area, industrial area, housing unit, or the owner of any other area that can be defined as a bounded location that is controlled by a single entity or jointly by multiple entities.)

As shown in FIG. 1, the business owner may be asked to provide information relating to the business owner's business, such as the type of business, the location of the business, or other information, in accordance with step 12.

The business owner may be asked to provide a measurement indicating the size of the bounded location (e.g., the square footage, or some other measurement), in accordance with step 14. As an example, if the bounded location relates to a business, the bounded location may be indicated to be the store space.

The business owner will further be required to provide if the bounded area is fully supported by a Wi-Fi signal, in accordance with steps 16.

The system may utilize the information provided by the business owner, including the measurement of the bounded area and whether the bounded area has Wi-Fi support, to determine pricing for providing the system to the business, in accordance with step 18. And the business owner can accept or decline the pricing, in accordance with step 20. If the business owner declines the pricing the sign-in process will end without any further steps occurring. Some embodiments of the present invention may not produce pricing in accordance with steps 18 and 20, and these step may be skipped in such embodiments.

If the pricing is accepted by the business owner or it isn't a requirement of the sign-in process, the business owner will be asked to submit a copy of a map of the bounded area to the system, in accordance with step 22. The system will convert the map to a three-dimensional (3D) version of the map, in accordance with step 24.

The 3D map will be made available to the business owner through the system, in accordance with step 26.

Figure 2:
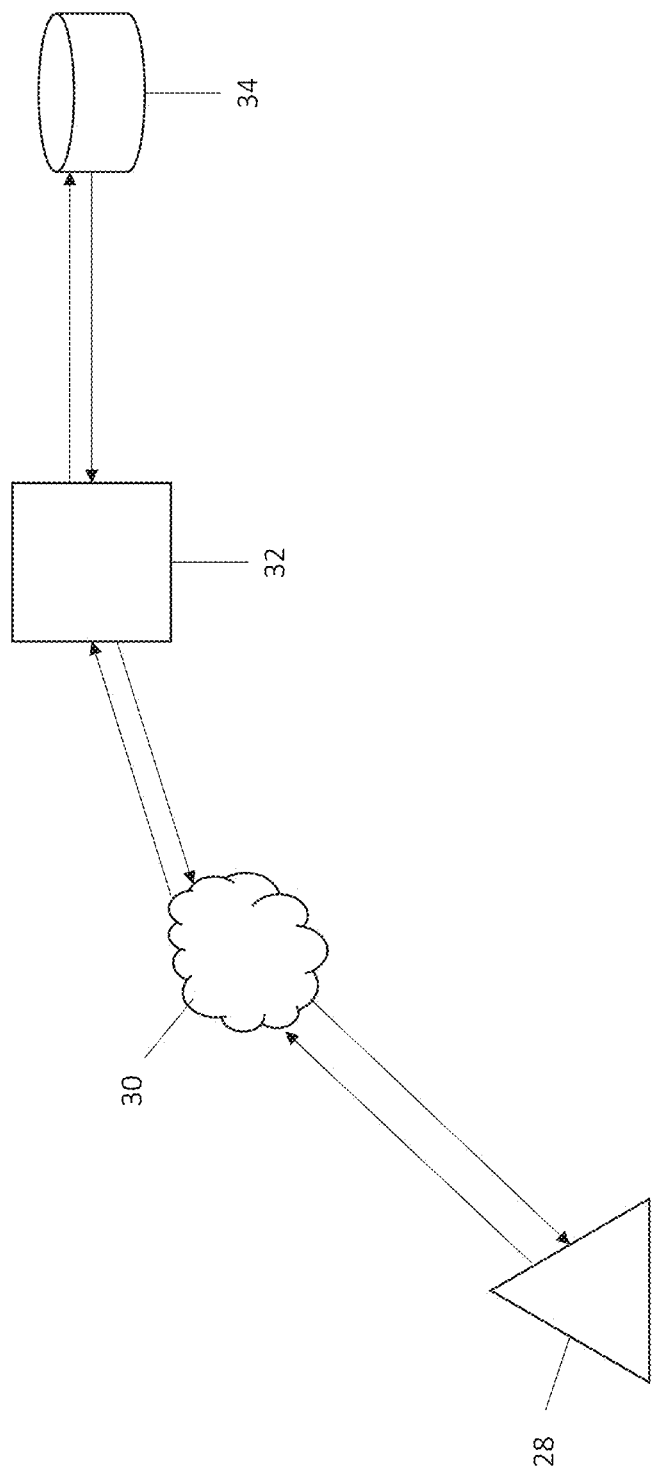
FIG. 2 is a systems diagram showing the elements required for, and the transfer of information between a user device and the system hub, in accordance with an embodiment of the present invention.

As shown in FIG. 2, the gateway 28 is connected to the system hub 32 such that input into the gateway through the input device (such as a keyboard, a touchscreen, a voice converter, or other input device) will be transmitted to the system. The information may be transmitted via an Internet connection 30, particularly if the gateway is a webpage or an app downloadable to a mobile device. Information transmitted to the system may be utilized by the system and stored by the system in storage 34. As shown in FIG. 2, information can be transmitted and received by each element of the system, such that information is bi-directional between elements. Information received by the system hub 32 may be processed by elements of the system and that are incorporated in the system hub, or otherwise connected wirelessly or through wires to the hub. Such elements may be positioned remotely from the hub. The results of such processing may be transmitted to the gateway and thereby to a user or to storage. Information received by the system hub may also be directly transmitted to storage without any processing.

Calibration Process

Figure 3:
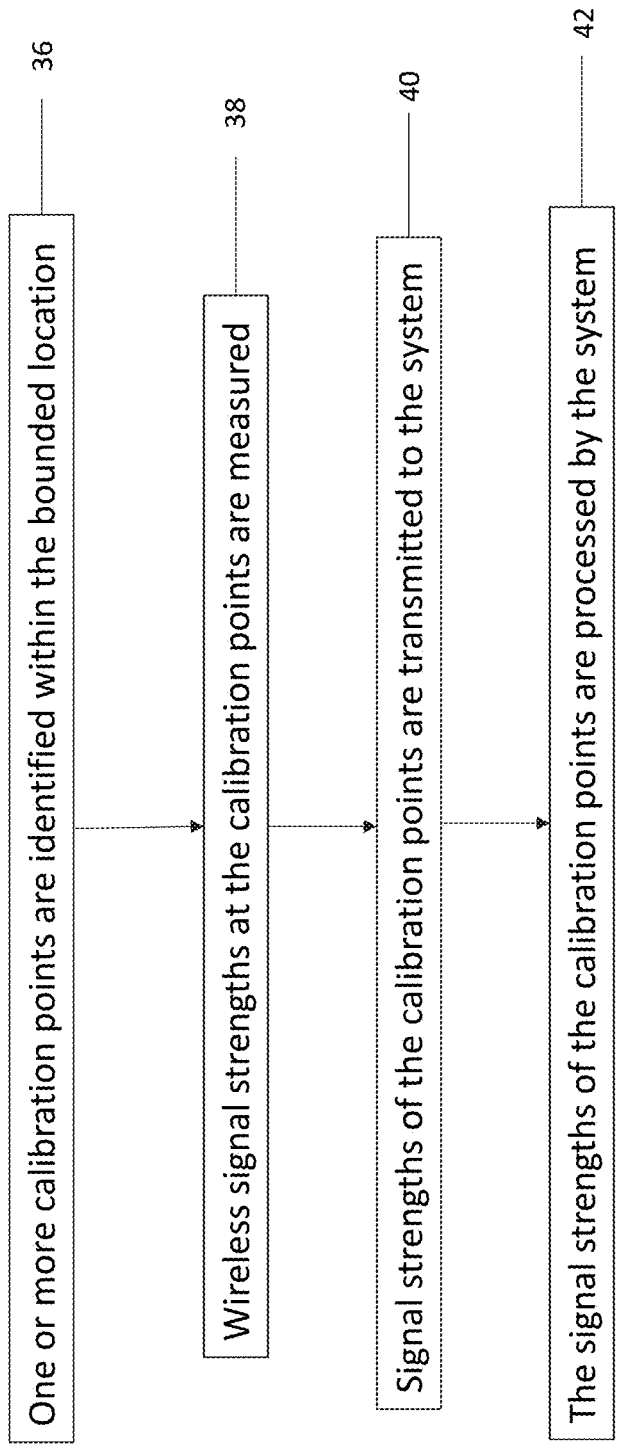
FIG. 3 is a flow chart of the steps of a calibration process, in accordance with an embodiment of the present invention.

Once the sign-in process is complete the system can be calibrated. As shown in FIG. 3, the calibration process involves several steps and occurs within the bounded location. One or more calibration points can be identified within the bounded location, in accordance with step 36. Measurements of wireless signal strengths are taken from the calibration points, in accordance with step 38. The measurements may be generated by a system administrator or a person such as a business owner walking around the calibration points and performing steps to generate the measurement of the wireless signal strengths from each calibration point.

There may be any number of calibration points within a bounded location. The number of calibration points may be directly related to the size and shape of the bounded location, as well as to other features of the bounded location, such as topography or other features thereof, and to the density of access points within the bounded location. As one example, there may be 10 calibration points within a bounded location that is a grocery store.

The signal strengths of the calibration points are transmitted to the system, in accordance with step 40. Processing, such as may be performed by a classifier algorithm or other processing application, is applied to the signal strengths of the calibration points, in accordance with step 42. The results of the processing include classifying the information as calibration location information that can be displayed as mapping information related to the bounded location and the calibration points therein.

Use of the Calibrated System

An app may be downloaded to a user's mobile device (e.g., a mobile device that has wireless connectivity, such as a laptop, a tablet, a mobile phone, a smart phone, or another mobile device) and the app may be operable with the system. The app may cause a map of the bounded area to appear on the user's mobile device. The user may be a customer, an employee, a student, or any other person in accordance with the type of bounded location where the system operates.

The app may show the map of the bounded area, and may further show the user's location in the map in real-time. The app may show the movement of the user within the bounded location over time. The app may show the last location of the user within the bounded location at the user's last visit, or the movement of the user within the bounded location during the user's last visit. A skilled reader will recognize the variety of information that may be presented to the user in relation to the user's location information that is generated by the system.

After the calibration process is completed, while a user is moving about the bounded location 48, a user's device 46 will take readings of Wi-Fi signal strengths from the same points as the calibration points 44a-44h. The readings of signal strengths will occur at points in time. For example, such as at regular points in time, or at random points in time. As one example, an embodiment of the present invention may take such readings every five seconds. Such Wi-Fi signal strength information is provided to the system and processed by the system, such as by a classifier algorithm or other processing application. The output generated by the processing indicates the nearest calibration point to the user's device.

A device with wireless connectivity (e.g., a tag, a mobile device, a smartphone, or other device) may further be attached to equipment (e.g., furniture, shelves, goods, displays, coffee carts, or any other equipment). The device attached to the equipment may be utilized to track the location and movement of the equipment, in the same manner as the mobile device tracks the location and movement of users. (Also, the movement of users may be tracked by devices such as are utilized with equipment.) The system may further utilize information relating to the equipment that is transmitted to the system hub to generate outputs relating to the equipment, and the use of one or more areas within the bounded location or facilities therein. For example, the system may generate information relating to the sale of goods in particular locations with a bounded area that is a store. This can assist with decision making regarding stocking of shelves and product placement.

Figure 5:
FIG. 5 shows a dashboard page displayed on a laptop, in accordance with an embodiment of the present invention.

As shown in FIG. 5, the user may be provided with access to a dashboard that may be displayed on a computer device 50 (e.g., a laptop, a computer, a mobile device, a smartphone, a tablet, or another computer device), and the dashboard may be accessed through a website, a mobile device application, or some other access point via the Internet. In some embodiments of the present invention, the dashboard may be divided into two sections:

Real-time data: this section may display a map of the bounded location in real-time. The persons within the bounded location may be represented by a dot or other symbol upon the map. The system may calculate the number of people within the bounded location based upon the location data relating to each person within the bounded location. The system may further determine how crowded the bounded location is, or certain areas of the bounded location are, at a point in time. Moreover, based upon the real-time location information that is generated and transmitted to the system, the system may process such information to generate other information relating to any of the following: movements of the people within the bounded location, the average amount of time each person is spending in the bounded location and at particular areas within the bounded location (the areas may be broader than a pin-point location, or may be a pin-point location), and the crowding of the bounded location or specific areas within the bounded location at points in time over a period of time.

Statistics and Insights: this section may display the information that is collected by the system relating to location information, and the results of processing such information. The exact information displayed in this section may be chosen by the user, such that information such as the time the user spends in a section of the store may be shown in one version of the display, and information regarding repeat visitors to the bounded area may be shown in another version of the display, in accordance with a user's choices for the displayed information. The format of the information displayed may also vary, such that information is displayed as statistics, numerical or graphic information, and/or other formats. The system may offer a list of information that can be displayed that may be chosen to be displayed by a user. This section may further display a thermal map showing the hotspots in the bounded location and routes of people within the bounded location. For example, the thermal map may indicate areas that are most visited by people within the bounded location. The routes may indicate the preferred paths that people walk within the bounded location. This information can further be processed by the system to produce insights, such as the prime location for particular goods for sale within a bounded location that is a store, or other insights.

The dashboard may be fully customizable by the user. A business owner may further choose the insights, statistics, or other displayed information that a user may view on the dashboard relating to the bounded location of the business owner.

Figure 6:
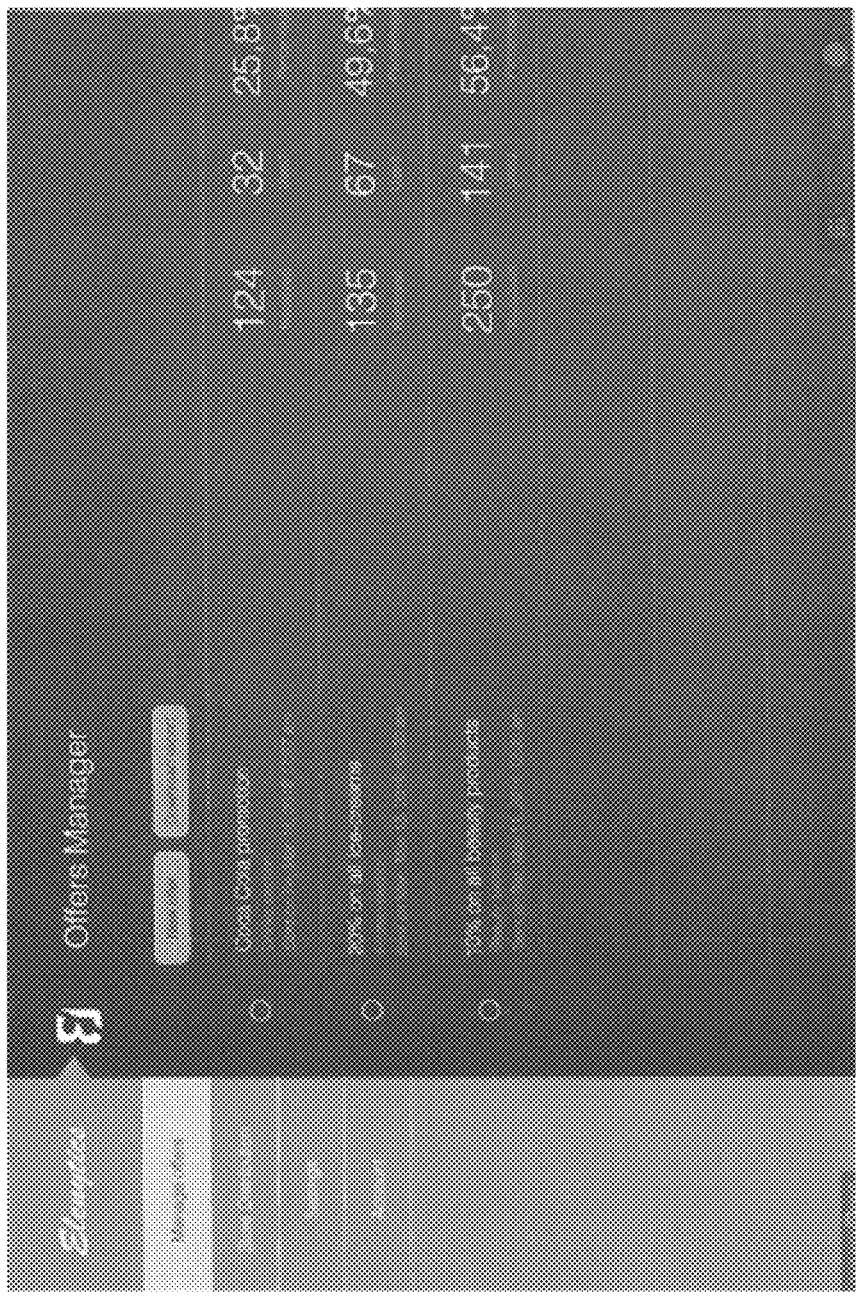
FIG. 6 shows a portion of a screen shot of an offers manager webpage, in accordance with an embodiment of the present invention.

Additional webpages, or dashboard pages, may be available to a user in embodiments of the present invention, such as one or more of the following:

Offers and Alerts: a business owner may set-up alerts or notifications relating to particular areas of the bounded location. For example, if the bounded location is a grocery store an alert relating to an item for sale may be generated if the user moves close to the location in the bounded location where the item is located. As an example, the alert or another notification may offer the user a promotional price on the item, and the alert or notification may appear on the user's mobile device. This function may assist the grocery store with moving sale priced stock, or stock that is near to expiration. An example of a portion of an offers manager page 56 that may provide a facility for setting offers to be sent by alert or notification to users is shown in FIG. 6.

Figure 7:
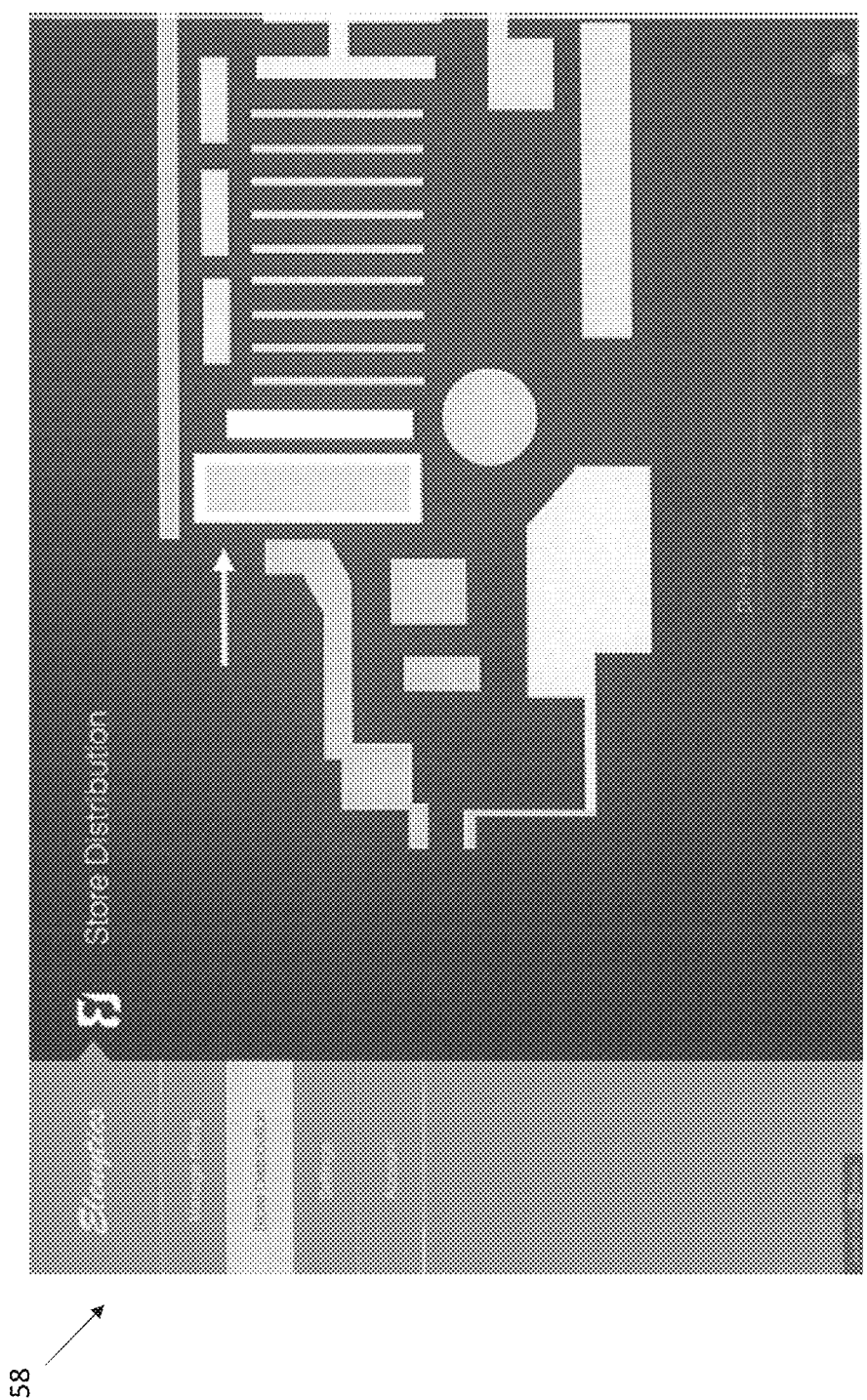
FIG. 7 shows a portion of a screen shot of a store distribution webpage, in accordance with an embodiment of the present invention.

Store Distribution: a business owner may be able to rename areas within the bounded location. For example, if the bounded location is an airport and a terminal is closed due to an unexpected issue, if the flights are redistributed through the other terminals, the business owner can change the flights accorded to various gates within the operating terminals. This will allow the gates to accurately reflect the flights that will arrive at or depart from each gate. An example of a portion of a store distribution page 58 that may provide store distribution information is shown in FIG. 7.

Settings: a business owner may utilize this section to cause the system to initiate and/or undertake particular processes, for example, such as calibration, a Wi-Fi test, viewer personalization, generating or revising a contact information section, or other processes relating to the function of the system.

Account: a business owner may be able to amend and update information relating to its profile (e.g., the profile is set-up initially based upon the information the business owner provides at the initial sign-in process), such as company information, location, password, photos to be stored or displayed, logos to be stored or displayed, etc.

Other query features and reporting features may be provided to the business owner or a user to view data processed by the system. A skilled reader will recognize the wide scope of query features and reporting features that may be provided in relation to the information gathered and processed by embodiments of the present invention. For example, queries that are Boolean searches or keyword searches based upon gathered and processed information stored in one or more databases in the storage, reports that incorporate graphs, reports that incorporate charts, or any other query or reporting features. The system may further be operable to provide downloadable reports and information, and printable reports and information, as well as displayed reports and information.

Embodiments of the present invention may incorporate off-the-shelf elements, such as a photon board that is a Particle.io™ photon board, cloud servers, such as Digital Ocean™ cloud servers, operating systems for services, such has Ubuntu Operating™ systems for servers, databases, such as Postgres SQL™ databases, data visualization elements, such as D3.js™ data visualization elements, and static content delivery and reverse proxy elements, such as Nginx™ static content delivery and reverse proxy elements.

Figure 4:
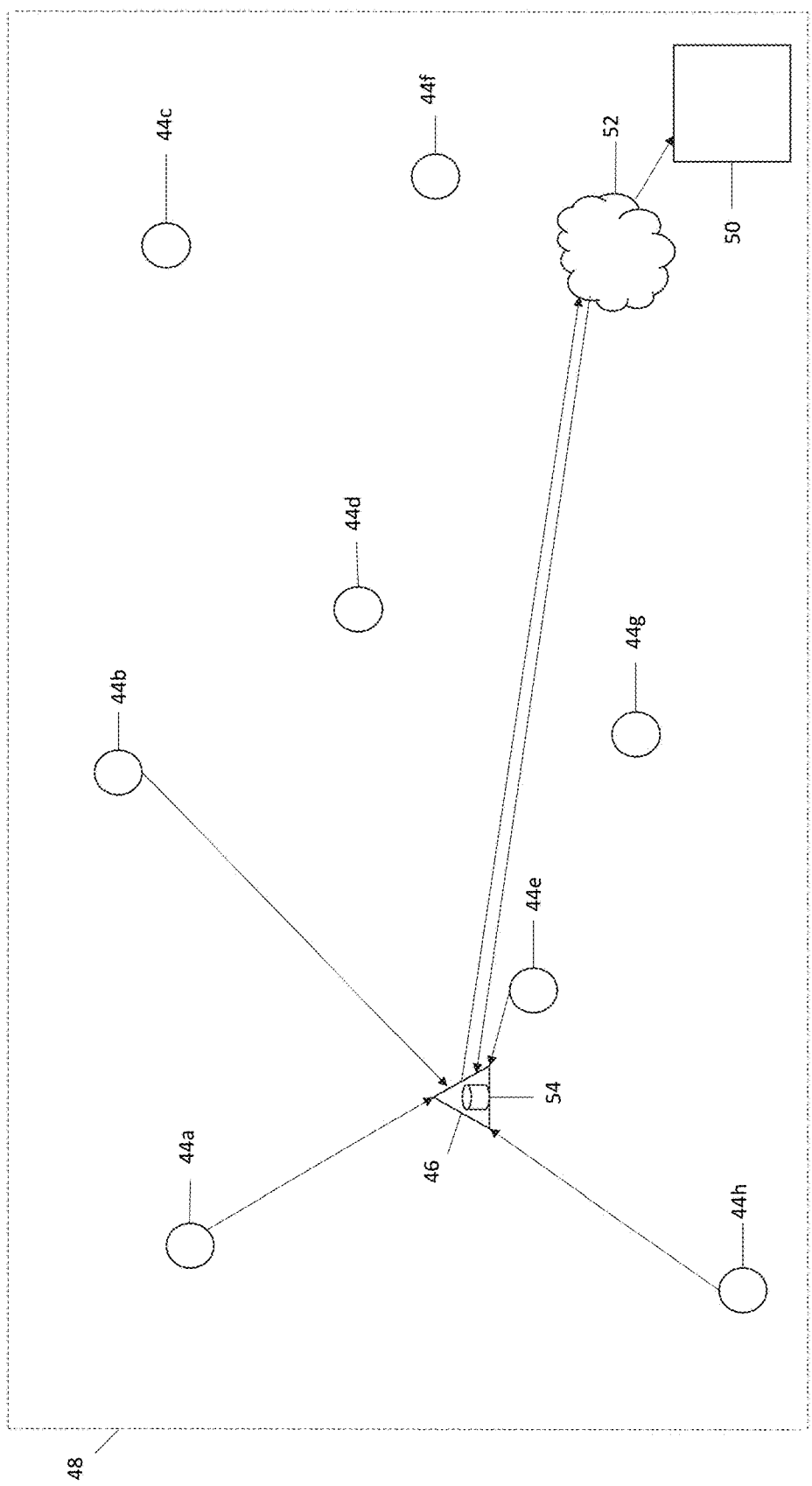
FIG. 4 is a systems diagram showing the elements required for, and the transfer of information between a user device and calibration points within a bounded location, in accordance with an embodiment of the present invention.

As shown in FIG. 4, the user's mobile device 46 may incorporate a microprocessor 54 that has wireless connectivity. The user's device may receive Wi-Fi signals from multiple calibration points in the vicinity of the mobile device. The microprocessor may analyze the multiple signals that are received. The mobile device may be continuously receiving Wi-Fi signals from calibration points in the vicinity of the mobile device, and the microprocessor may be taking measurements of such Wi-Fi signals. The mobile device may transfer information relating to the signal strengths that the microprocessor measures to the system processor 50 via an Internet 52 connection. The system processor and Internet connection thereto are shown in FIG. 4 as existing within the bounded location 48, but in other embodiments of the present invention these elements may be outside of and/or remote from the bounded location.

It will be appreciated by those skilled in the art that other variations of the embodiments described herein may also be practiced without departing from the scope of the invention. For example, the present invention may have applications in the healthcare market, in hospitals, retirement homes, or long-term care facilities for tracking patients, staff and equipment. Embodiments of the present invention may further be implemented at schools and other campuses.

We claim:

1. A computer-implemented method comprising:
   receiving one or more wireless signal strength measurements measured at a plurality of calibrations points within a bounded region over a first time period;
   receiving one or more wireless signal strength measurements measured by a device over a second time period, wherein the first time period does not overlap with the second time period;
   identifying a calibration point from the plurality of calibration points by evaluating the one or more wireless signal strength measurements measured by the device over the second time period relative to the one or more wireless signal strength measurements measured over the first time period, wherein the calibration point is representative of a location of the device within the bounded region; and
   generating a graphical map of the bounded region, the graphical map providing a graphical visualization of the device as the device moves about the bounded region, wherein the graphical map comprises a graphical device element representative of the device and graphical calibration point elements corresponding to the plurality of calibration points, wherein the graphical device element is positioned on the graphical map near a given graphical calibration point element of the graphical calibration point elements based on the location of the device within the bounded region, the given graphical calibration point element corresponding to the calibration point representative of the location of the device.

2. The computer-implemented method of claim 1, further comprising generating device tracking data characterizing a movement of the device within the bounded region by repeating the identifying as the device moves about the bounded region, wherein the graphical map is generated based on the device tracking data.

3. The computer-implemented method of claim 2, wherein the device tracking data characterizes a path of the device over the second time period within the bounded region.

4. The computer-implemented method of claim 1, further comprising:
   transmitting the graphical map to another device comprising a display; and
   causing the display of the other device to render the graphical map to provide a user of the other device with a graphical visualization of the location of the device within the bounded region.

5. The computer-implemented method of claim 1, wherein the plurality of calibration points within the bounded region correspond to a subset of calibration points identified from a set of calibration points, wherein the subset of calibration points correspond to optimal calibrations points.

6. The computer-implemented method of claim 5, wherein the one or more wireless signal strength measurements measured by the device are generated at one of defined instances of time over the second time period and at random instances of time over the second time period.

7. The computer-implemented method of claim 1, wherein a number of the plurality of calibration points within the bounded region is a function of a size and a shape of the bounded region.

8. The computer-implemented method of claim 7, wherein the number of the plurality of calibration points within the bounded region is further a function of one of a topography of the bounded region and a density of access points within the bounded region.

9. The computer-implemented method of claim 1, wherein the wireless signal strength measurements correspond to one of Wi-Fi signal strength measurements, Bluetooth signal strength measurements, and a combination thereof.

10. The computer-implemented method of claim 9, wherein the bounded region comprises one of an indoor region, an outdoor region, and a combination thereof.

11. The computer-implemented method of claim 10, wherein the device comprises one of a mobile device, a tag, a smartphone, a laptop, a shopping cart, a shopping basket and a user associated device.

12. A computer-implemented method comprising:
    receiving one or more wireless signal strength measurements measured by a first device at a plurality of calibration points within a bounded region over a first time period, wherein the plurality of calibration points correspond to a subset of calibration points identified from a set of calibration points, the subset of calibration points corresponding to optimal calibrations points;
    receiving one or more wireless signal strength measurements measured by a second device over a second time period, wherein the wireless signal strength measurements measured by the first device and the second device comprise one of Wi-Fi signal strength measurements, Bluetooth signal strength measurements, and a combination thereof;
    identifying a given calibration point from the subset of calibration points by evaluating the one or more wireless signal strength measurements measured by the second device relative to the one or more wireless signal strength measurements measured by the first device at the subset of calibration points, wherein the given calibration point is representative of a location of the second device within the bounded region; and generating a graphical map comprising graphical calibration point elements corresponding to the subset of calibration points and a graphical device element representative of the second device, wherein the graphical device element is positioned near a given graphical calibration point element of the graphical calibration point elements, the given graphical calibration point element corresponding to the given calibration point representative of the location of the second device.

13. The computer-implemented method of claim 12, wherein a number of the plurality of calibration points within the bounded region is a function of a size and shape of the bounded region.

14. A computer-implemented method comprising:
receiving one or more wireless signal strength measurements measured by a calibration device at each of a plurality of calibrations points within a bounded region over a first time period;
receiving one or more wireless signal strength measurements measured by a plurality of devices over a second time period while the plurality of devices are within the bounded region, wherein the one or more wireless signal strength measurements measured by the calibration device and the plurality of devices comprise one of Wi-Fi signal strength measurements, Bluetooth signal strength measurements, and a combination thereof;
identifying a calibration point from the plurality of calibration points for each device of the plurality of devices, wherein each identified calibration point is representative of a location of a respective device of the plurality of devices within the bounded region, wherein the identifying comprises evaluating the one or more wireless signal strength measurements measured by the plurality of devices relative to the one or more wireless signal strength measurements measured by the calibration devices at each of the plurality of calibrations points; and
generating a graphical map representative of the bounded region with location data characterizing the location of the respective device of the plurality of devices within the bounded region, wherein the graphical map provides a graphical visualization of each device traveling within the bounded region in one of real-time and non-real time.

15. The computer-implemented method of claim 14, further comprising generating device tracking data for each device by repeating the identifying as the device travels within the bounded region.

\* \* \* \* \*